(12) United States Patent
Duyvesteyn (10) Patent No.: US 10,988,828 B2
(45) Date of Patent: Apr. 27, 2021

(54) EXTRACTION OF SCANDIUM VALUES FROM COPPER LEACH SOLUTIONS

(71) Applicant: Scandium International Mining Corporation, Sparks, NV (US)

(72) Inventor: Willem P. C. Duyvesteyn, Reno, NV (US)

(73) Assignee: Scandium Intrenational Mining Corporation, Sparks, NV (US)

(*) Notice: Subject to any disclaimer, the term of this patent is extended or adjusted under 35 U.S.C. 154(b) by 0 days.

(21) Appl. No.: 16/198,756

(22) Filed: Nov. 21, 2018

(65) Prior Publication Data

US 2019/0161827 A1    May 30, 2019

Related U.S. Application Data

(60) Provisional application No. 62/588,931, filed on Nov. 21, 2017.

(51) Int. Cl.
*C22B 59/00* (2006.01)
*C22B 3/26* (2006.01)

(52) U.S. Cl.
CPC ............ *C22B 59/00* (2013.01); *C22B 3/0005* (2013.01)

(58) Field of Classification Search
None
See application file for complete search history.

(56) References Cited

U.S. PATENT DOCUMENTS

| 3,214,239 | A | | 10/1965 | Hazen et al. | |
|---|---|---|---|---|---|
| 3,637,711 | A | * | 1/1972 | Budde, Jr. et al. | .. C07D 215/26 546/179 |
| 4,574,072 | A | * | 3/1986 | Horwitz | ................. C01F 17/10 423/9 |
| 4,751,061 | A | * | 6/1988 | Kim | ......................... C22B 3/24 423/21.5 |
| 6,312,500 | B1 | * | 11/2001 | Duyvesteyn | ............. C22B 1/243 75/712 |
| 6,440,383 | B1 | | 8/2002 | Duyvesteyn et al. | |
| 8,372,367 | B2 | | 2/2013 | Duyvesteyn | |
| 9,410,227 | B2 | * | 8/2016 | Boudreault | ............. C22B 34/34 |
| 9,982,325 | B2 | | 5/2018 | Duyvesteyn | |
| 9,982,326 | B2 | | 5/2018 | Duyvesteyn | |
| 2006/0222580 | A1 | | 10/2006 | Tinkler et al. | |
| 2011/0298270 | A1 | | 12/2011 | Duyvesteyn | |
| 2012/0204680 | A1 | | 8/2012 | Duyvesteyn | |
| 2012/0207656 | A1 | | 8/2012 | Duyvesteyn | |
| 2012/0263637 | A1 | | 10/2012 | Duyvesteyn | |

(Continued)

*Primary Examiner* — Melissa S Swain
(74) *Attorney, Agent, or Firm* — John A. Fortkort; Fortkort & Houston PC (57) ABSTRACT

A method is provided for extracting scandium values from an ore feedstock. The method includes providing a feedstock of a copper ore which contains scandium values; extracting scandium values from the ore with a leaching solution, thereby obtaining a pregnant leachate; contacting the pregnant leachate with an ion exchange resin, thereby extracting scandium values from the pregnant leachate and forming a loaded extractant; stripping the scandium values from the loaded extractant with a stripping solution, thereby forming a loaded stripping solution; and precipitating the scandium values from the loaded stripping solution as a scandium-containing precipitate.

20 Claims, 3 Drawing Sheets

(56) References Cited

U.S. PATENT DOCUMENTS

| | | | |
|---|---|---|---|
| 2015/0104361 A1* | 4/2015 | Boudreault | C22B 3/42 423/21.5 |
| 2015/0307966 A1* | 10/2015 | Voight | B01J 49/07 423/21.5 |
| 2016/0153070 A1* | 6/2016 | Duyvesteyn | C22B 3/0005 75/743 |
| 2016/0289795 A1* | 10/2016 | Duyvesteyn | C22B 59/00 |
| 2018/0030577 A1 | 2/2018 | Duyvesteyn | |

* cited by examiner

EXTRACTION OF SCANDIUM VALUES FROM COPPER LEACH SOLUTIONS

CROSS-REFERENCE TO RELATED APPLICATION

This application is a continuation-in-part application of U.S. Patent Application No. 62/588,931, filed Nov. 21, 2017, having the same inventor and entitled "Extraction of Scandium Values From Copper Leach Solutions," which is incorporated herein by reference in its entirety.

FIELD OF THE DISCLOSURE

The present disclosure relates generally to systems and methodologies for the recovery of scandium values, and more particularly to systems and methodologies for the solvent extraction of scandium from copper leach solutions.

BACKGROUND OF THE DISCLOSURE

The production of scandium metal is hampered by the unavailability of naturally occurring deposits of concentrated scandium. Instead, scandium tends to occur as a trace element in ores containing other metal values. For this reason, scandium is commonly harvested from the processing of byproducts of other metal production or refining processes. Thus, for example, scandium has been extracted from the red muds resulting from bauxite processing, or from uranium tailings.

The production of scandium is further hampered by the significant challenges attendant to isolating the metal from other metals which commonly occur with it, both in natural mineral formations and in the tailings, sludges or byproducts from other metal recovery operations or industrial processes. In particular, scandium has chemical and physical properties which are similar to some other metals, such as thorium, zirconium and titanium. Consequently, many of the methods, systems and materials commonly used in the art to isolate metals do not yield pure samples of scandium in sufficiently high yields. This may be due, for example, to insufficient selectivity (with respect to scandium) of the chelating agents, binders or resins utilized to isolate scandium in these processes, or to problems in releasing scandium from these chelating agents, binders or resins after extraction has occurred. Unfortunately, since the concentration of scandium in most starting materials is relatively low to begin with, the use of low yield processes in isolating scandium from such materials is a significant cost multiplier, thus rendering the use of such processes commercially impractical.

Recently, significant advances in the art have been made in the extraction of scandium from nickel laterite ores. These methods are described in commonly assigned U.S. 2016/0153070 (Duyvesteyn), entitled "Systems And Methodologies For Direct Acid Leaching Of Scandium-Bearing Ores".

SUMMARY OF THE DISCLOSURE

In one aspect, a method for extracting scandium values from an ore feedstock is provided. The method includes providing a feedstock of an ore (which may be a copper-bearing ore, such as an ore obtained from porphyry copper deposits) which contains scandium values; extracting scandium values from the ore with a leaching solution, thereby obtaining a pregnant leachate; contacting the pregnant leachate with an ion exchange resin, thereby extracting scandium values from the pregnant leachate and forming a loaded extractant; stripping the scandium values from the loaded extractant with a stripping solution, thereby forming a loaded stripping solution; and precipitating the scandium values from the loaded stripping solution as a scandium-containing precipitate.

DETAILED DESCRIPTION

While the methods described in U.S. 2016/0153070 (Duyvesteyn) represent a notable advance in the art, further advances are needed in the art. In particular, systems and methodologies are needed to recover scandium values from other types of ores and feedstocks.

It has been found that certain copper bearing ores also contain trace amounts of scandium. These include, for example, ores that are sourced from porphyry copper deposits. These ores have different chemistries, and require different processes for scandium extraction, than those developed for nickel laterite ores. Systems and methodologies are disclosed herein which may be utilized to extract scandium values from these and other ores or feedstocks in an efficient and highly selective manner.

In a preferred embodiment, a methodology is disclosed herein which commences with providing a feedstock containing scandium values. The feedstock is preferably an ore (such as, for example, a copper-bearing ore obtained from porphyry copper deposits), but may also be a scandium-bearing byproduct of another process, or another suitable scandium-containing material. Scandium values are then extracted from the feedstock with a leaching solution, thereby obtaining a pregnant leachate. The pregnant leachate is then contacted with an ion exchange resin, thereby extracting scandium values from the pregnant leachate and forming a loaded extractant. The scandium values are then stripped from the loaded extractant with a stripping solution, thereby forming a loaded stripping solution. Scandium values are then precipitated from the loaded stripping solution as a scandium-containing precipitate.

Figure 1:
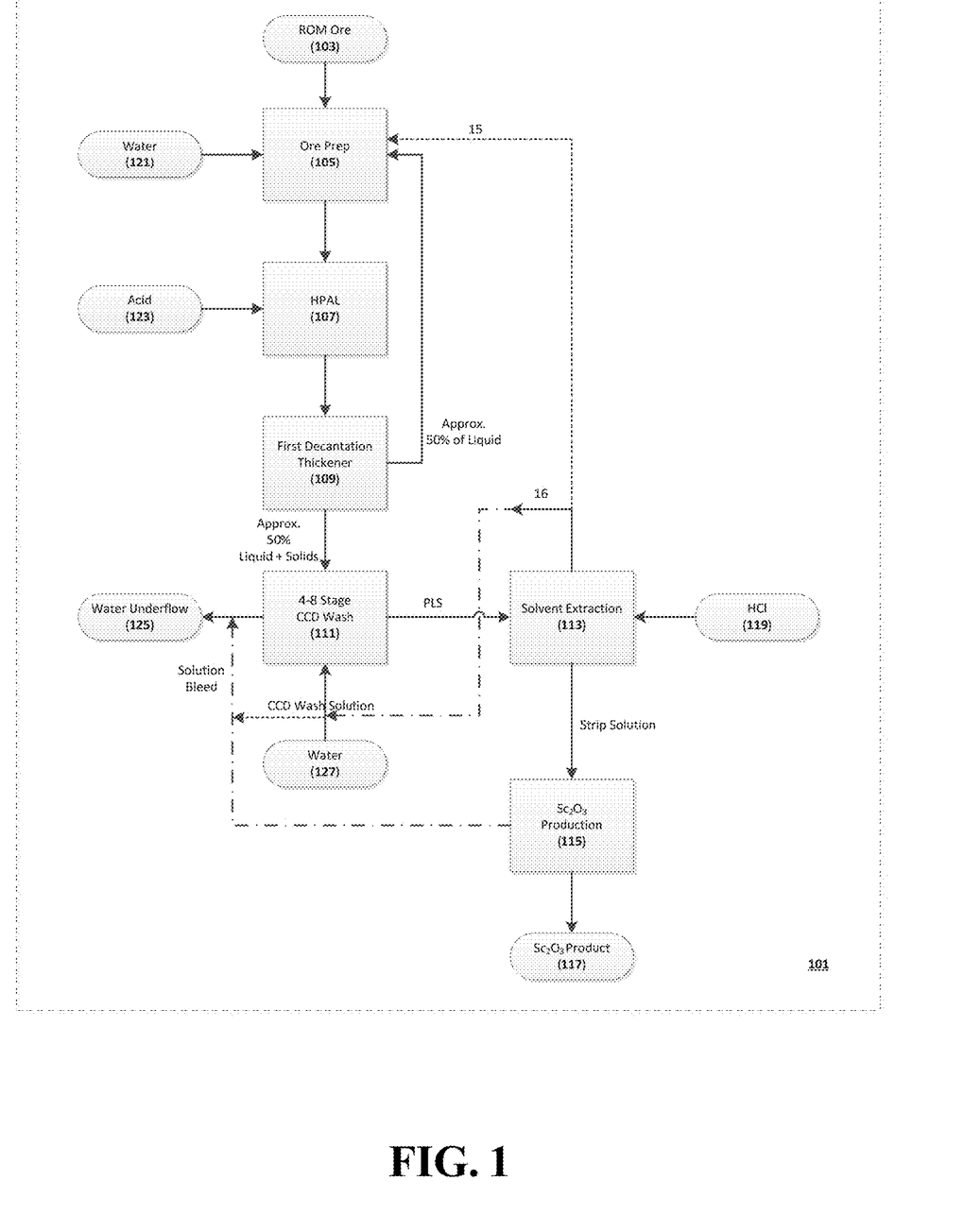
FIG. 1 is a flowchart of a particular, non-limiting embodiment of a process for obtaining scandium from an ore feedstock in accordance with the teachings herein.

FIG. 1 depicts a particular, non-limiting embodiment of a solvent extraction process in accordance with the teachings herein. The process 101 depicted therein commences with a suitable ore feedstock 103 (such as, for example, a scandium-containing, copper-bearing ore of the type obtained from a porphyry copper deposit). The ore may be suitably prepared 105 for leaching as, for example, by creating a slurry through the addition of water 121.

The ore is then subjected to high pressure acid leaching (HPAL) 107, which typically involves the addition of acid 123 to the ore. A first decantation thickener step 109 follows, in which approximately 50% of the liquid from the HPAL 107 is decanted and recycled to the ore preparation step 105.

The remaining (approximately 50%) liquid and solids are routed to a 4-8 stage Counter Current Decantation (CCD) wash circuit 111. The CCD wash circuit 111 typically requires a source of additional water 127 as an input. The CCD wash circuit 111 produces a pregnant leach solution (PLS) as the primary output, and generates water underflow 125 as a byproduct.

The PLS is passed to a solvent extraction circuit 113, which preferably utilizes HCl 119 as an input. A preferred embodiment of the solvent extraction circuit 113 is described in commonly assigned U.S. Ser. No. 14/976,421 (Duyvesteyn), filed on Dec. 21, 2015 and entitled "Solvent Extraction of Scandium From Leach Solutions", which is incorporated herein by reference in its entirety. The strip solution is then passed to an $SC_2O_3$ production circuit 115, which generates the final $SC_2O_3$ product 117. The raffinate generated from the solvent extraction circuit 113 may be recycled to the ore preparation step 105 and/or the CCD wash solution used in the CCD wash step 111.

As noted above, the preferred method herein for extracting scandium values from ores involves high pressure acid leaching (HPAL) 107 of scandium laterite ore. One objective of the HPAL process 107 is to produce a slurry of the ore that can be processed through an autoclave. The autoclave preferably runs at a temperature within the range of about 225° C. to about 300° C., and more preferably within the range of about 255° C. to about 270° C., and at a pressure within the range of about 300 psia to about 1000 psia, and more preferably within the range of about 450 psia to about 850 psia. The ore is re-pulped with water to produce a slurry density which is preferably between 10% and 50% solids, more preferably between 15% and 45% solids, and most preferably between 25% and 35% solids.

As seen in FIG. 1, the leachate from the HPAL process 107 is preferably passed through a solvent extraction (SX) circuit 111, thus producing a scandium bearing solvent and a raffinate. The raffinate contains a significant amount of low grade sulfuric acid due to the carry-over of acid through the SX circuit 111. The SX circuit 111 feed is derived from the HPAL 107 discharge, where acid levels of as much as 50 gpl can be experienced. Since a higher acidity is beneficial for scandium extraction by solvent extraction from a leach solution (see U.S. Ser. No. 14/976,421 (Duyvesteyn), referenced above), a higher acidity would incur a higher cost if the acid cannot be recycled. This acid in this type of process is normally neutralized with lime, a process which entails a double cost in terms of wasted acid and the lime consumed in neutralizing it.

An improvement can be made to the scandium flowsheet by using the waste aqueous stream (raffinate) of the solvent extraction circuit to repulp the ore (see circuit 15 in FIG. 1) instead using of water for that purpose. Since acid costs can amount to as much as 50% of the operating cost, the recycle of some of the acid in this manner is very cost effective.

The presence of acid in the solvent extraction (SX) 113 feed arises from the use of acid (typically sulfuric acid) in the HPAL leaching 107 step, which may be required for several purposes. First of all, additional acid may be required to replace acid consumed by the solids as aluminum oxide in the ore (if it is present) in converted into alunite $(H_3O)Al_3(SO_4)_2(OH)_6$ precipitates. A small amount of basic iron sulfate $(FeOHSO_4)$ may also be formed, which may result in an acid loss to the solid tails.

Secondly, various metals (such as, for example, magnesium and manganese) in the ore dissolve and remain in solution, thereby taking up sulfuric acid. A certain amount of acid is required to remain in solution to provide the driving force for the leach reaction to take place.

Finally, that while leaching is essentially the chemical reaction between the hydrogen ion in the aqueous phase and oxygen present in the solid phase, the amount of hydrogen that is available in HPAL leaching at the temperatures experienced inside of the autoclave is only 50% of that present in the leach solution. This is due the stability of the bisulfate ion under HPAL conditions according to the following equilibrium:

$$H_2SO_4 = H^+ + HSO_4^-$$

Hence, the leach discharge when at room temperature still contains a significant amount of "free" sulfuric acid (as much as 50 gpl or about one third of the acid added to the leach).

The pregnant leach solution (PLS) obtained as a result of the counter current decantation 111 of the HPAL 107 discharge may be processed in a nickel flowsheet by neutralization of all the acid (requiring expensive lime) prior to either solvent extraction, ion exchange or hydroxide precipitation. In the case of a scandium flowsheet, there is typically no requirement to neutralize any excess acid. To the contrary, the extraction efficiencies of many solvents used in scandium extraction are found to actually improve as the pH of the scandium PLS is reduced, thus making the addition of acid beneficial (see, e.g., commonly assigned U.S. 62/096,538, entitled "Solvent Extraction of Scandium from Leach Solutions", which is incorporated herein by reference). Consequently, the waste solution, depleted of scandium, contains significant acid values that may be re-utilized to re-pulp the ore during ore preparation.

Various modifications may be made to the foregoing process. For example, in some embodiments, the solution from the $SC_2O_3$ production step 111, which may be scandium-barren or may simply contain a much lower level of scandium than the strip solution, may be recycled to the ore preparation step 105, alone or in combination with the raffinate. Similarly, any waste solution containing scandium, either generated during processing of scandium ore or purchased from third parties, may be combined with the raffinate stream to the ore preparation step 105.

As noted in FIG. 1, a preferred embodiment of the scandium recovery process disclosed herein utilizes a first decantation thickener option 109. It is to be noted that such an option is typically not employed in HPAL processing of conventional nickel laterite ores. This conventional route essentially uses 4-8 washing thickeners in a counter current mode.

There are some significant process benefits to be gained if the PLS scandium concentration is enriched beyond the current levels of about 150 ppm. This may be achieved by a one stage settling step in the first decantation thickener 109 step and by directing the overflow (laden with scandium) back to the ore preparation step 105 (as, for example, by mixing it with the raffinate and recycling the mixture back to the ore preparation step 105). This overflow may contain as much as 50% of the liquid (and hence of the scandium) present in the HPAL leach discharge. In some embodiments, this process step may more than double the scandium content of the PLS.

Figure 2:
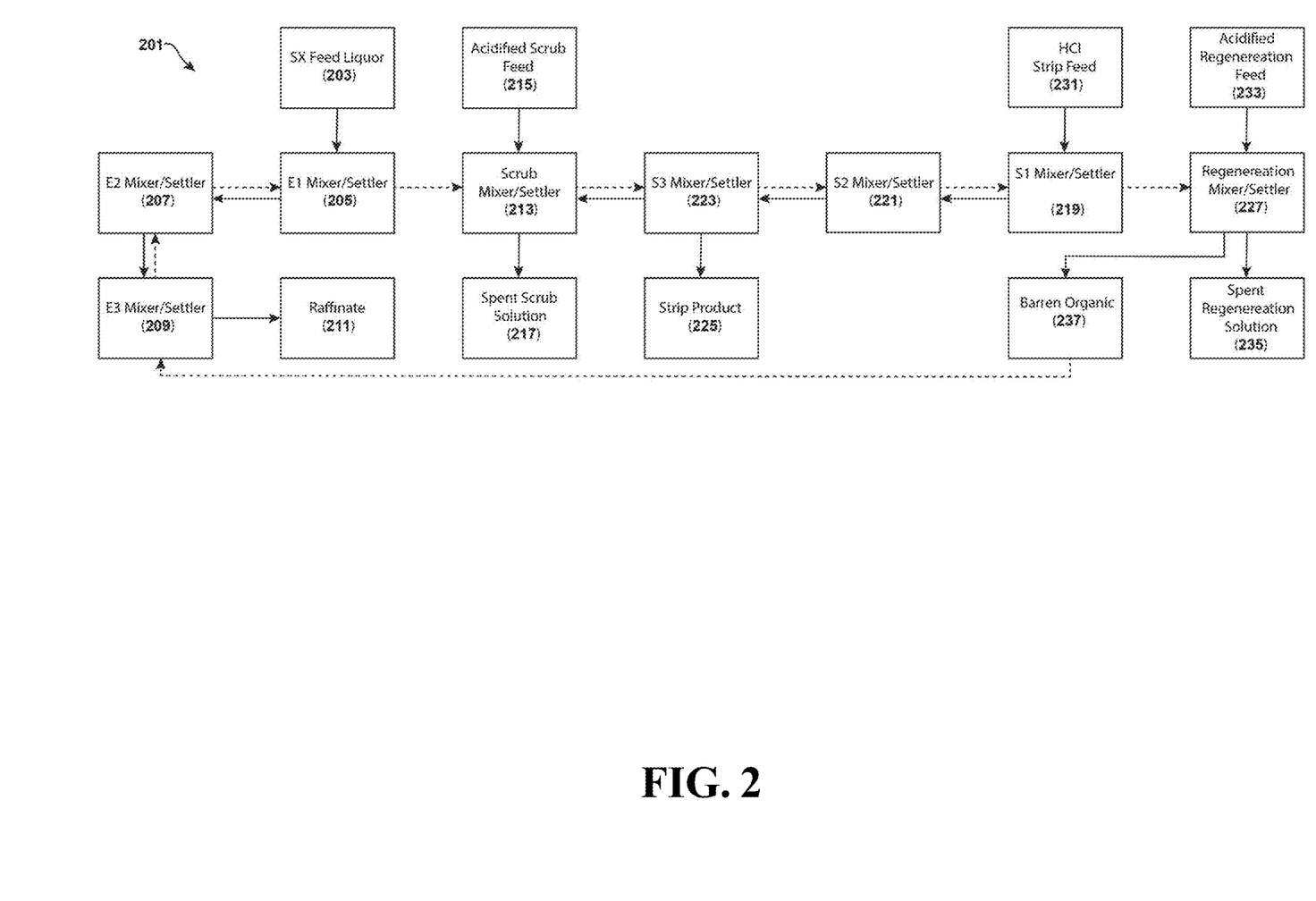
FIG. 2 is a flowchart of an embodiment of a scandium solvent extraction process in accordance with the teachings herein.

FIG. 2 is a flowchart depicting a first particular, non-limiting embodiment of a system (and associated methodology) in accordance with the teachings herein for recovering scandium from a scandium-bearing organic solution. Such a solution may be obtained by performing solvent extraction on a variety of sources including, for example, a scandium-containing, copper-bearing ore of the type described herein. In this flowchart, the dashed lines indicate the flow of organic solvent through the system, while the opposing lines indicate the flow of aqueous media through the system.

Scandium metal enters the system 201 as a solvent extraction feed liquor 203, which is preferably a scandium-bearing organic solution (this solution may have a scandium concentration of greater than 0.5 g/L Sc upon entry to the system or upon leaving the system). For example, the solvent extraction feed liquor 203 may be obtained by performing solvent extraction on a leachate derived from a leaching process such as a high pressure acid leach (HPAL) process, an acid bake process, or an atmospheric pressure acid leach process. The solvent extraction feed liquor 203 may also be obtained by performing solvent extraction on a byproduct from another industrial process such as a metal refining operation, or by performing solvent extraction on solutions obtained by leaching or otherwise treating such a byproduct. By way of specific example, the solvent extraction feed liquor 203 may be obtained by performing solvent extraction on metal sludges, on byproducts from the treatment of tungsten or uranium tailings, on waste streams resulting from the processing of titanium-containing ores and concentrates into titanium dioxide pigments, or on red mud, a waste product of the Bayer process used to refine bauxite into alumina.

The system 201 is equipped with first 205, second 207 and third 209 mixers/settlers. Each of these mixers/settlers is a phase separation chamber in which the organic and aqueous phases are vigorously mixed and then allowed to settle so that phase separation can occur. Preferably, these mixers/settlers take the form of a tank equipped with a suitable agitator and with inlets and outlets for the aqueous and organic phases. After vigorous agitation, the solution in each tank is allowed to settle and undergo phase separation, after which the phases are separately decanted off.

As indicated in the drawing, the aqueous content of the feed liquor 203 moves through the first 205, second 207 and third 209 mixers/settlers in succession, and exits the third mixer/settler 209 as a raffinate 211. Similarly, the organic content of the feed liquor 203 moves successively (and in the opposite direction of the aqueous content of the feed liquor 203) through the third 209, second 207 and first 205 mixers/settlers, and then onto the scrub mixer/settler 213.

In the scrub mixer/settler 213, the scandium-bearing organic phase is subjected to scrubbing with an acidified scrub feed 215. The acidified scrub feed 215 is an acidic solution used to scrub the feed liquor 203. In a preferred embodiment, the acidified scrub feed 215 contains sulfuric acid, though embodiments are possible in which the acidified scrub feed 215 contains one or more sulfates instead of, or in addition to, sulfuric acid. Such scrubbing may be useful in some embodiments to, for example, reduce the iron content of the feed liquor 203. The aqueous component then exits the scrub mixer/settler 213 as spent scrub solution 217, while the organic component from the scrub mixer/settler 213 is passed successively to the third 223, second 221 and first 219 mixer/settlers.

The scandium content of the scandium-bearing organic phase is then stripped with an HCl strip feed 231, which is preferably an aqueous HCl/MgCl$_2$ solution, in the first 219, second 221 and third 223 mixers/settlers. Each of these mixer/settlers is a phase separation chamber in which the organic and aqueous phases are vigorously mixed and then allowed to settle so that phase separation can occur. Each mixer/settler is preferably equipped with an agitator and with inlets and outlets for the organic and aqueous phases. The scandium concentration in the resulting aqueous strip product 225 is significantly increased compared to the scandium concentration in the original feed liquor 203. The strip product 225 may then be subsequently processed to yield scandium metal, scandium oxide ($Sc_2O_3$), a scandium-bearing alloy, or another desired scandium-bearing product.

The use of MgCl$_2$ in the HCl strip feed 231 provides some significant advantages over some other salts such as NaCl. Amine type solvents such as Primene JMT, which are desirable to use as extractants in the systems and methodologies described herein (see examples below), typically require an anion in the solvent (such as, for example, bisulfate) to load scandium. Given the low pHs which are preferably utilized in the leach solutions disclosed herein, there is generally a sufficient concentration of bisulfate anions in equilibrium with sulfuric acid for scandium loading purposes. This sulfate content is stripped from the organic extractant along with scandium, and reports to the solvent extraction loaded strip liquor (LSL). However, if a salt such as NaCl is used in the HCl strip feed 231 and the concentration of sulfate is sufficiently high, then the LSL will also contain a significant concentration of Na$^+$ ions. This situation can induce the formation of scandium oxalate double salts when (as is preferred) oxalate is used to precipitate scandium from the scandium loaded LSL, thus significantly reducing the purity of the scandium oxalate obtained. This problem is mitigated, if not avoided altogether, by the use of MgCl$_2$. As an added benefit, MgCl$_2$ is found to effectively decrease the effective pH of concentrated chloride solutions from the levels that pure HCl solutions produce. This, in turn, allows the use of stripping solutions with lower concentrations of HCl.

When the stripping solution comprises HCl and NaCl, the concentration of HCl in the stripping solution is typically at least 2M, preferably at least 2.5M, and more preferably at least 3M. The molar ratio of HCl to NaCl is preferably within the range of 1 to 2, more preferably in the range of 1.25 to 1.75, and most preferably about 1.5. When the stripping solution comprises HCl and MgCl$_2$, the concentration of HCl in the stripping solution is typically at least 0.1M, and preferably at least 0.25M. When the stripping solution comprises HCl and MgCl$_2$, the concentration of HCl in the stripping solution is typically greater than 0.1M but less than 2.5M, is preferably within the range of 0.25M to 1M, is more preferably within the range of about 0.3M to about 0.7M, and is most preferably about 0.5M. The molar ratio of HCl to NaCl is preferably within the range of 1 to 2, more preferably in the range of 1.25 to 1.75, and is most preferably about 1.5.

The stripped organic phase is passed to a regeneration mixer/settler 227, where it is treated with an acidified regeneration feed 233. The regeneration mixer/settler 227 is a phase separation chamber in which the organic and aqueous phases are vigorously mixed and then allowed to settle so that phase separation can occur. The regeneration mixer/settler 227 is equipped with an agitator to vigorously mix the stripped organic phase and the acidified regeneration feed 233, and is further equipped with an inlet, a first outlet for the spent regeneration solution 235, and a second outlet for the regenerated, barren organic phase 237. The barren organic phase 237 is then recycled to the third mixer/settler 209.

It will be appreciated that several modifications are possible to the system and process depicted in FIG. 2 to accommodate various feedstocks or to obtain various process objectives. For example, various additional steps may be incorporated into the process. For example, one or more steps may be added to the process reduce the initial concentration of iron or other metals in the feedstock, to adjust the pH of the feedstock, or to remove or reduce the concentration of organic contaminants or particular metals in the feedstock. Moreover, the number of mixers/settlers may be increased or decreased to optimize the process, increase its efficiency, or make it more cost effective.

Various materials and procedures may be utilized in the systems and methodologies described herein. These include various extractants, diluents, modifiers, amines and salts. The following are some preferred examples.

Figure 3:
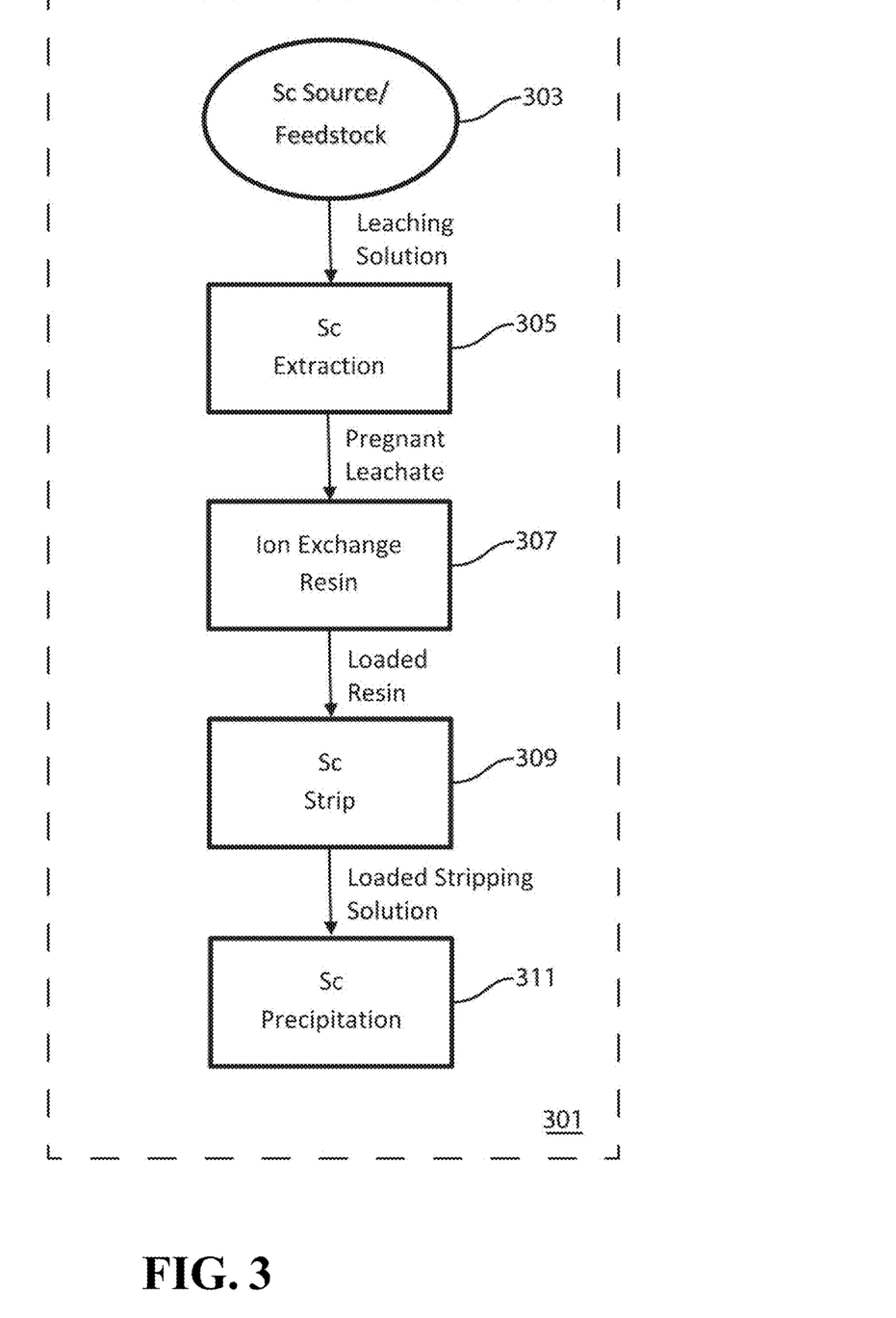
FIG. 3 is a flowchart of a particular, non-limiting embodiment of a scandium recovery process in accordance with the teachings herein.

FIG. 3 illustrates a particular, non-limiting embodiment of the overall scandium recovery process in accordance with the teachings herein. With reference thereto, the method 301 commences with the provision of a scandium-containing feedstock 303 or source. The scandium-containing feedstock may be a scandium-containing ore, a scandium-bearing byproduct, waste material or precipitate from another process, or another suitable scandium-containing material. Preferably, however, the scandium-containing feedstock is a scandium-containing, copper-bearing ore, and more preferably, such an ore which has been obtained from a porphyry copper deposit.

A leaching solution, which is preferably a non-chloride based leaching solution, is then utilized to extract 305 the scandium values from the scandium-containing feedstock, thereby yielding a pregnant leachate. The pregnant leachate is then passed through an ion exchange resin 307 which is selective to scandium, thus loading the resin with scandium values. The loaded resin is then stripped 309 to yield a loaded stripping solution. The loaded stripping solution is then treated to induce precipitation 311 of the scandium values from the loaded stripping solution, in the form of scandium oxalate, scandium oxide, or another suitable precipitate.

Feedstock Compositions

TABLE 1 sets forth the compositions of two samples of a copper-bearing ore obtained from a porphyry copper deposit. This ore, which may be used as a feedstock in embodiments of the systems and methodologies described herein, contains small (though valuable) concentrations of scandium.

TABLE 1

Chemical Composition of Feed Solutions

| Element | Sample 1 Concentration (ppm) | Sample 2 Concentration (ppm) |
|---|---|---|
| Ag | <1 | <1 |
| Al | 9105 | 16142 |
| As | <1 | <1 |
| Ba | <1 | <1 |
| Bi | <1 | <1 |
| Ca | 537 | 651 |
| Cd | 9 | 27 |
| Co | 51 | 56 |
| Cr | 3 | 7 |
| Cu | 1113 | 1417 |
| Fe | 554 | 4569 |
| Hg | <1 | <1 |
| K | 118 | 78 |
| La | <1 | 2 |
| Mg | 11834 | 8230 |
| Mn | 1378 | 1337 |
| Mo | <1 | <1 |
| Na | 799 | 314 |
| Ni | 40 | 30 |
| P | 66 | 396 |
| Pb | <1 | <1 |
| Sb | <1 | <1 |
| Sc | 1 | 2 |
| Sr | <1 | <1 |
| Ti | 1 | 1 |
| Tl | 1 | 2 |
| V | 2 | 2 |
| W | 4 | 13 |
| Zn | 341 | 1111 |
| Zr | <1 | <1 |

Extractants

Various extractants may be utilized in the systems and methodologies described herein. Some particular, non-limiting examples are set forth in TABLE 2 below.

TABLE 2

Extractants

| Trade Name/ Designation | Chemical Name | Description | Chemical Structure |
|---|---|---|---|
| Cyanex 272 | Di-2,4,4-trimethylpentyl phosphinic acid | An organo-phosphorous acid extractant | $HO-\overset{O}{\underset{CH_2CH(CH_3)CH_2(CH_3)_2CCH_3}{\overset{\|}{P}}}-CH_2CH(CH_3)CH_2(CH_3)_2CCH_3$ |
| Ionquest 801 | 2-ethylhexyl phosphonic acid mono-2-ethylhexyl ester | An organo-phosphorous acid extractant | $HO-\overset{O}{\underset{OCH_2CH(C_2H_5)(CH_2)_3CH_3}{\overset{\|}{P}}}-CH_2CH(C_2H_5)(CH_2)_3CH_3$ |
| D2EHPA | di-2-ethylhexyl phosphoric acid | An organo-phosphorous acid extractant | $HO-\overset{O}{\underset{OCH_2CH(C_2H_5)(CH_2)_3CH_3}{\overset{\|}{P}}}-OCH_2CH(C_2H_5)(CH_2)_3CH_3$ |

TABLE 2-continued

Extractants

| Trade Name/ Designation | Chemical Name | Description | Chemical Structure |
| --- | --- | --- | --- |
| Versatic 10 Acid | 2-methyl-2-ethylheptanoic acid | A carboxylic acid extractant | $H_5C_2-\underset{\underset{CH_3}{\vert}}{\overset{\overset{COOH}{\vert}}{C}}-C_5H_{11}$ |
| LIX63 | 5,8-diethyl-7-hydroxy-6-dodecanone oxime | A hydroxyoxime extractant | $H_3C(H_2C)_3(H_5C_2)HC-\underset{\underset{HON}{\vert}}{C}H-\underset{\underset{OH}{\vert}}{C}H-CH(C_2H_5)(CH_2)_3CH_3$ |
| LIX54-100 | β-diketone hydroxyoxime | A hydroxyoxime extractant | Aromatic ring with $R_1$ substituent, connected to $-C(=O)-CH_2-C(=O)-R_2$ |
| LIX84 | 2-hydroxy-5-nonylacetophenone | A hydroxyoxime extractant | Aromatic ring with $C_9H_{19}$, $OH$, and $C(CH_3)=NOH$ substituents |
| LIX860 | 5-dodecylsalicyl-aldoxime | A hydroxyoxime extractant | Aromatic ring with $C_{12}H_{25}$, $OH$, and $CH=NOH$ substituents |
| LIX984 | See above | A mixture of LIX860 and LIX84 at a 1:1 ratio | See above |
| Primene JMT | 1,1,3,3,5,5,7,7,9,9-decamthyl decyl amine | An amine extractant | $\begin{array}{c}C_9H_{18}-C_{11}H_{23}\\ \phantom{C_9H_{18}-}CH-NH_2\\ C_9H_{19}-C_{11}H_{23}\end{array}$ |
| N1923 | | A primary amine extractant | $R_1-\underset{\underset{R_3}{\vert}}{N}-R_2$ where $R_1 = R_2 = R_3 = CH_3(CH_2)_7-$ |
| TBP | Tri-butyl phosphate | A phosphoric ester neutral extractant | Tri-butyl phosphate structure |

TABLE 2-continued

Extractants

| Trade Name/ Designation | Chemical Name | Description | Chemical Structure |
|---|---|---|---|
| TOA (Alamine 336) | Tri-octyl amine | A tertiary amine extractant | (structure shown) |

Diluents

Various diluents may be utilized in the systems and methodologies described herein. Some particular, non-limiting examples are set forth in TABLE 3 below.

TABLE 3

Diluents

| Tradename | Decription | Chemical Description |
|---|---|---|
| Shellsol D70 | 100% aliphatic | Petroleum naptha |
| Shellsol 2046 | 81% aliphatic, 19% aromatic | Kerosine (petroleum), hydrodesulfurized |
| Shellsol A200 | 100% aromatic | Aromatic hydrocarbon |

Various modifiers may be utilized in the systems and methodologies disclosed herein. These include, without limitation, TBP and isodecanol (IDA).

Various amines may be utilized in the systems and methodologies disclosed herein. Preferably, such amines are primary amines. In some embodiments, the amine may have one or more tertiary alkyl groups.

Various salts may be utilized in the systems and methodologies disclosed herein. These include, without limitation, various alkali metal salts and ammonium salts. For example, salts may be utilized in the stripping solutions of these systems and methodologies which have the formula $M_xA_y$, where x and y are preferably (but not necessarily) non-zero, positive integer values, wherein M is selected from the group consisting of Na, K, Li and $NH_4$, and wherein A is a suitable anion. Preferably, the anion of the salt is selected to be the same as the anion of the acid it is used in conjunction with, although the use of non-chloride salts is preferred. Thus, for example, if the acid is sulfuric acid, the use of sodium, potassium, lithium and ammonium sulfates is preferred; if the acid is nitric acid, the use of sodium, potassium, lithium and ammonium nitrates is preferred; and if the acid is phosphoric acid, the use of sodium, potassium, lithium and ammonium phosphates is preferred. However, it will be appreciated that, in some applications, various mixtures of the foregoing acids and salts may be utilized. Moreover, in some applications, acids and anions other than those explicitly listed above may be utilized.

In some embodiments of the processes described herein, ore feeds subjected to acid baking may first be subject to a pretreatment process whereby carbonate components of the ore (if such are present) which are mostly barren of metal values are removed. This may occur, for example, through the use of a flotation using standard calcite/dolomite fatty acid flotation, or by leaching of the carbonate with hydrochloric acid or nitric acid. In a separate unit operation, the calcium chloride/nitrate solution generated by such a treatment may be subsequently treated with sulfuric acid to precipitate gypsum, thereby recycling the hydrochloric/nitric acid back to the leaching process.

Unless otherwise indicated, various acids may be utilized in the processes described herein. These include, without limitation, sulfuric acid, nitric acid and hydrochloric acid. In some embodiments, acid may be generated in situ as, for example, through the addition of $SO_2$ to an aqueous solution.

Ion Exchange Resins

Various ion exchange resins may be utilized in the systems and methodologies described herein. In some embodiments, these ion exchange resins may comprise a material that includes at least one moiety selected from the group consisting of amine moieties, phosphonic moieties, phosphinic moieties, phosphoric acid ester moieties, pyrophosphate moieties, and bisphosphonate moieties. Preferably, the ion exchange resin comprises a material having at least one amine moiety, and more preferably, the amine moiety is a primary amine moiety such as, for example, a benzylamine group. In one especially preferred embodiment, the ion exchange resin comprises 16,16-dimethylheptadecan-1-amine. In another preferred embodiment, the ion exchange resin comprises a primary amine of the following structure:

In some embodiments, the material is a primary amine has at least one tertiary alkyl group, or having a plurality of tertiary alkyl groups. Thus, for example, the material may be an amine having the structure $R_3CNH_2$, wherein R is a t-alkyl group, or wherein each R has 5 to 7 carbon atoms. In an especially preferred embodiment, the material is Primene JM-T. In some embodiments, these ion exchange resins may comprise a vivinylbenzene (DVP)-crosslinked polymer.

In some embodiments, the ion exchange resin comprises at least one organo-phosphorous material. This organo-phosphorous material may be a phosphoric acid such as, for example, di-(2-ethylhexyl)phosphoric acid. The organo-phosphorous material may also contain at least one phosphonic moiety or at least one phosphinic moiety. The organo-phosphorous material may also be an organo-phosphoric acid ester such as, for example, a mono-organo-phosphoric acid ester or a di-organo phosphoric acid ester. The organo-phosphorous material may also be an organo-phosphonic acid such as, for example, 2-Ethylhexyl 2-ethylhexyphosphonic acid. The organo-phosphorous material may also be an organo phosphinic acid such as, for example, a bis(2,4,4-trimethylpentyl)phosphinic acid. The organo-phosphorous material may also be an organo pyrophosphate or a bisphosphonate.

In some embodiments, the ion exchange resin comprises a material selected from the group consisting of di(2-ethylhexyl) phosphoric acid (D2EHPA, or HDEHP, mono (2-ethylhexyl)2-ethylhexyl phosphonate bis(2,4,4-trimethylpentyl)monothiophosphinic acid), octyl phenyl phosphate (OPAP), 2-ethylhexylphosphonic acid mono-2-ethylhexyl ester (PC88A) and optionally toluene, tributyl phosphate, di-isoamylmethyl phosphonate, 7-(4-ethyl-1-methyloctyl)-8-hydroxyquinoline, di-(2-ethylhexyl) phosphinic add, bis (2,4,4-trimethylpentyl) phosphinic acid, 8-hydroxyquinoline, and (2-ethylhexyl)phosphonic acid, diethylenetriamine-penthaacetic acid (DTP), ethylenediaminetetraacetic (EDTA), 1,4,7,10-tetraazacyclododecane-1,4,7,10-tetraacetic acid (DOTA), and bis(2,4,4-trimethylpentyl)monothiophosphinic acid.

In some embodiments, the ion exchange resin may comprise at least one hydroxyquinoline, or a mixture of at least one hydroxyquinoline and nonylphenol, or 7-(4-ethyl-1-methylocty)-8-hydroxyquinoline.

The ion exchange resin may take various forms. For example, in some embodiments, the ion exchange resin may be in the form of microporous beads, or may be a solvent impregnated resin (SIR). In some embodiments, the ion exchange resin may form the stationary phase of an ion exchange process.

The ion exchange resin may be designed with various selectivities or non-selectivities depending, for example, on the composition of the feedstock and the particular metals contained therein. Thus, for example, the ion exchange resin may be selective to scandium, but not selective to copper or iron.

In some embodiments, the pH of the stripping solution may be maintained within a particular range. Thus, for example, in some embodiments, a basic solution may be utilized to strip scandium values from an ion exchange resin. In such embodiments, the ion exchange resin may be protonated after scandium values have been stripped from it.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limitation in any other dependent claim without departing from the scope of the invention, even if such a combination is not explicitly set forth in any of the following claims.

What is claimed is:

1. A method for extracting scandium values from an ore feedstock, comprising:
   providing a feedstock of a copper ore which contains scandium values;
   extracting scandium values from the ore with a leaching solution, thereby obtaining a pregnant leachate;
   contacting the pregnant leachate with an ion exchange resin, thereby extracting scandium values from the pregnant leachate and forming a loaded extractant;
   stripping the scandium values from the loaded extractant with a stripping solution, thereby forming a loaded stripping solution; and
   precipitating the scandium values from the loaded stripping solution as a scandium-containing precipitate.

2. The method of claim 1, wherein the leaching solution is a non-chloride based leaching solution.

3. The method of claim 1, wherein the ion exchange resin comprises a material that includes at least one moiety selected from the group consisting of amine moieties, phosphonic moieties, phosphinic moieties, phosphoric acid ester moieties, pyrophosphate moieties, and bisphosphonate moieties.

4. The method of claim 3, wherein the ion exchange resin comprises at least one material selected from the group consisting of 16,16-dimethylheptadecan-1-amine, di-(2-ethylhexyl)phosphoric acid, 2-Ethylhexyl 2-ethylhexyphosphonic acid, bis(2,4,4-trimethylpentyl)phosphinic acid, 7-(4-ethyl-1-methylocty)-8-hydroxyquinoline and divinylbenzene (DVP)-crosslinked polymers.

5. The method of claim 1, wherein the ion exchange resin comprises a mixture of at least one hydroxyquinoline and nonylphenol.

6. The method of claim 5, wherein the ion exchange resin comprises 7-(4-ethyl-1-methylocty)-8-hydroxyquinoline.

7. The method of claim 1, wherein said ion exchange resin is a solvent impregnated resin (SIR).

8. The method of claim 1, wherein said copper ore is from a copper porphyry deposit.

9. The method of claim 8, wherein said ion exchange resin forms a stationary phase that is selective to scandium.

10. The method of claim 1, wherein the ore contains iron, wherein the ion exchange resin is not selective to copper, and wherein the ion exchange resin is not selective to iron.

11. The method of claim 9, wherein stripping the scandium values from the loaded extractant includes stripping the ion exchange resin with a basic solution to form the loaded stripping solution, and further comprising protonating the ion exchange resin after scandium values have been stripped from it.

12. The method of claim 1, wherein the pregnant leachate is obtained from a process selected from the group consisting of high-pressure acid leaching (HPAL) processes, atmospheric pressure acid leaching processes and acid baking processes.

13. The method of claim 1, wherein the pH of the pregnant leachate is less than 1.3.

14. The method of claim 1, wherein the stripping solution contains hydrochloric acid.

15. The method of claim 1, wherein the ion exchange resin comprises an amine having a plurality of t-alkyl groups.

16. The method of claim 1, wherein the stripping solution is an organic solvent that includes a diluent and a phase modifier.

17. The method of claim 1, wherein the leachate further contains one or more ions selected from the group consisting of Al, Mg, Mn, Ni and Co.

18. The method of claim 1, wherein the loaded stripping solution is a scandium-loaded organic solvent that has a scandium concentration of greater than 0.5 g/L Sc.

19. The method of claim 1, wherein said scandium-containing precipitate comprises $Sc_2O_3$.

20. The method of claim 1, wherein precipitating the scandium values from the loaded stripping solution includes adding oxalic acid to the loaded stripping solution, and wherein said scandium-containing precipitate comprises scandium oxalate.

\* \* \* \* \*